April 3, 1956
H. A. FREDIANI
2,740,694
METHOD AND APPARATUS FOR CONTROL OF
TITRATIONS AND OTHER PHENOMENA
Filed Nov. 22, 1952
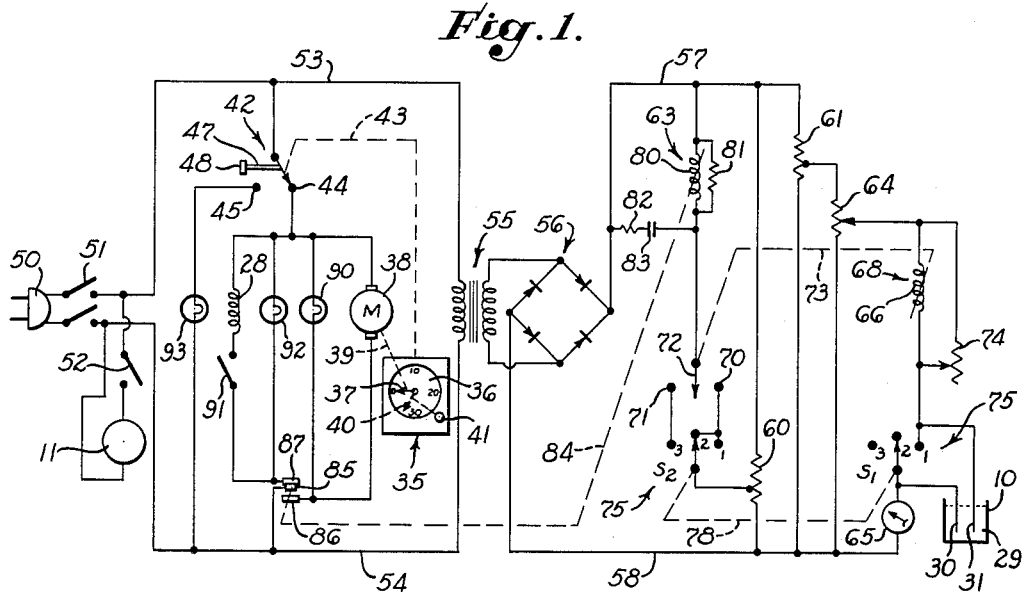
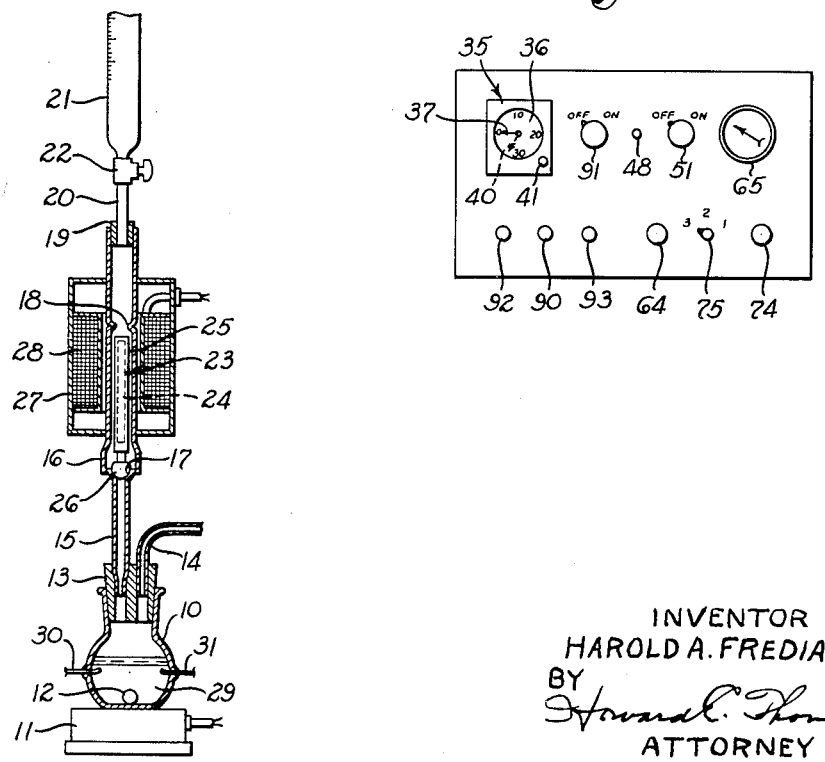
INVENTOR
HAROLD A. FREDIANI
BY
Howard C. Thompson
ATTORNEY

United States Patent Office 2,740,694
Patented Apr. 3, 1956

2,740,694

METHOD AND APPARATUS FOR CONTROL OF TITRATIONS AND OTHER PHENOMENA

Harold A. Frediani, Rahway, N. J.

Application November 22, 1952, Serial No. 322,064

20 Claims. (Cl. 23—230)

The present invention relates to a method and apparatus for displacing the condition of an environment, for example, a chemical or electrochemical environment, toward a precise final equilibrium value. It will be exemplified as incorporated in an automatic titrating apparatus, particularly in an apparatus for the titrimetric determination of water content using the Karl Fisher technique and the dead-stop endpoint method.

Prior to the introduction of the Karl Fisher technique, the common means for the accurate determination of water content involved measurement of weight loss upon over drying. That method leaves much to be desired because heating may decompose the product, leading to abnormal weight loss and erroneously high apparent moisture content; likewise, volatile material other than water may be evaporated thus introducing additional errors. The presence of water in various non-aqueous liquids has called for other techniques, usually inconvenient and relatively inaccurate. The Karl Fisher method proposed a convenient reagent reacting quantitatively with water and susceptible of accurate endpoint indication and has eliminated the above shortcomings and provided a rapid and accurate tool for water determination.

Prior to the present invention, it has been common to employ the Karl Fisher technique in manual titrations, the endpoint often being detected by noting small changes in color. These are typically not clearcut, involving a transition from a canary yellow to a pale amber tint. Alternatively, as a form of electrometric endpoint detection in manual titrations, the classical potentiometric technique has sometimes been employed. More satisfactory, however, have been certain other electrometric methods, particularly of the type employing polarized metallic electrodes. In these methods, the sensing technique involves use of a pair of electrodes, usually of the same material, which experience sudden changes in polarization at the endpoint. In one such system, a polarizing potential is applied to the electrodes through a relatively high-resistance circuit, the voltage across the electrodes showing a sudden change at the endpoint of certain chemical titrations. In another such system, a relatively low-resistance electrode circuit is employed to apply a small and substantially constant difference in potential across the electrodes. The endpoint is in this case evidenced by the appearance or disappearance of electrolytic current at the endpoint, as indicated by a galvanometer in series with the electrodes. This method has been called the "dead-stop" technique because, in one direction of titration, the galvanometer current is sustained at a substantially constant level and then drops abruptly to zero at the endpoint. When titrating to the endpoint in the opposite direction, the initial current is zero but rises suddenly at the endpoint to a thereafter-constant level. In both of the aforesaid systems, the sudden change at the endpoint, whether a sudden change in current or potential, results from a change in polarization, i. e., appearance or disappearance of polarization at one or both of the electrodes. Hereinafter the invention will be specifically exemplified by employing the dead-stop technique in a Karl Fisher titration, although it will be understood that it is adaptable to other endpoint detection methods and other types of titrations whether or not of the Karl Fisher type.

In using the dead-stop endpoint, a small potential difference is applied between the two similar electrodes, typically platinum, while those electrodes are immersed in the solution to be titrated. The initial current is limited to a very small value, of the order of 5 to 10 microamperes, due to the fact that the cathode is polarized and no mechanism exists for discharging ions at the cathode. At the endpoint, however, de-polarization of the cathode occurs, due effectively to the sudden appearance of free iodine in the solution, and an abrupt rise in current is observed, to a level of the order of 40 or 50 microamperes.

In manually performed dead-stop titrations, it has been observed that the galvanometer pointer experiences transient excursions beyond the endpoint as this endpoint is approached, these excursions being successively of increasing duration and usually occurring because of a temporary slight apparent excess of reagent in the titration medium. Aside from the effect of the nature of the sample, the temporary excursions may be partly due to delay in effecting complete stirring as the endpoint is approached. More seriously, the temporary excursions may be due to delays involving extraction and/or chemical reaction with the reagent, particularly in the analysis of samples that are insoluble, e. g., dehydrated foodstuffs, certain dairy products, pharmaceuticals, etc., which are typically suspended in a suitable non-aqueous medium such as methanol to make a convenient titration sample. In such instances, it can be said that titration involves extraction of the water from the solid into the liquid phase prior to reaction with the Karl Fisher reagent, thus involving a delay which may considerably prolong persistence of transient endpoints and make determination of the true endpoint exceedingly difficult. In some instances, the sample materials are conducive to parasitic side reactions with the reagent, and this too may prolong the transient endpoints and displace the endpoint value, making the true endpoint ambiguous and subjecting the termination point of the titration to considerable error.

The present invention involves a novel titrating apparatus and method which operates automatically and which eliminates the difficulties of manual techniques. A salient feature of the invention is that it provides for automatic timing of each transient excursion as the endpoint of the titration is approached.

In this connection, the invention provides for automatically setting a timer in motion as soon as an abrupt change in electrode current occurs at the start of each transient excursion. When the excursion disappears, the timer is automatically reset to zero. The apparatus is such that when the duration of any transient excursion reaches a predetermined value, which may be suitably preset by the operator, the titration is automatically terminated, further delivery of reagent is prevented, and a signal device indicates to the operator that the titration is complete.

The invention also makes provision for performing the so-called "back" titrations. In the usual "forward" direction of titration, the Karl Fisher reagent is contained in a burette while the titration vessel contains the sample whose water content is to be determined. In the "back" titration, a standardized solution is used, comprising usually a water-containing solvent of known composition, e. g., methanol-water, which is added from a burette to the titration vessel, the latter containing Karl Fisher reagent. The reagent to be thus measured may be the excess remaining after a fixed or known quantity of reagent is added to the sample. The amount of the unreacted excess accordingly provides a measure of water in the sample, this being a preferred procedure in certain cases. The instrument responds, when running at "back" titration, not to sudden de-polarization at the endpoint, but rather to sudden polarization. Accordingly, upon occurrence of each transient endpoint, a drop in current is observed. Accordingly, the instrument can be made selectively responsive to transient excursions which start with a sudden increase or decrease in current, it being an object of the invention to provide such an apparatus.

A further object of the invention is to produce titration equipment which will titrate reproducibly and automatically and which will eliminate the personal factors involved in the older manual operation and thereby permit greatly increased endpoint accuracy.

It is to be understood, however, that the method and apparatus of the invention are not limited to Karl Fisher titrations and the dead-stop technique. They are useful in other instances where it is desired to displace the condition of an environment toward a precise final equilibrium value, particularly where the environment is characterized by transient excursions past the equilibrium value as displacement actions are applied in an attempt to reach such value, and particularly where the environment tends to reverse said displacement in a direction toward the final value to reach such value in a time which depends upon the closeness of the condition to the desired final value. Generally speaking, it is an object of the invention to apply to such an environment while in a first state a displacement action tending to displace the environment forwardly or in a given direction toward the desired final value and therebeyond to initiate a transient excursion; then temporarily withholding the displacement action until the reverse displacement swings the environment back through the final value and therebeyond to a second state which is usually closer to the final value than the first state; successively repeating the displacement and withholding steps to produce a plurality of such transient excursions of successively longer time duration; timing the duration of each transient excursion; and finally terminating further displacement actions when such timing evidences a transient excursion which equals or exceeds in duration a predetermined time, preferably an adjustable time. The invention also includes an operating means for applying, withholding and reapplying such a displacement action; a sensing means for creating a signal each time the condition swings in the given or forward direction beyond the desired final value and for creating another signal each time the reverse displacement swings the condition in an opposite or reverse direction beyond such value at the end of a transient excursion; an operative connection between the sensing means and the operating means to withhold the displacement action in response to the first signal and reapply it in response to the other signal; and a timer operatively connected to the sensing means to start and reset respectively upon occurrence of such signals so as to successively and individually measure the time duration of the transient excursions, the timer being operatively connected to the operating means to terminate all applications of the displacement actions in the given or forward direction when the duration of any transient excursion equals or exceeds a predetermined time.

Other objects and advantages of the invention will be evident to those skilled in the art from the herein-contained exemplary embodiment of the invention as applied to automatic titration by the dead-stop endpoint technique.

Referring to the drawing:

Fig. 1 is a schematic wiring diagram of an automatic titrator of this type;

Fig. 2 is a vertical sectional view through a portion of the titrating apparatus; and Fig. 3 is a front view of the instrument case used in association with the equipment shown in Fig. 2 and housing most of the electrical elements shown in Fig. 1.

This application constitutes a continuation-in-part of my prior application, Ser. No. 216,325, filed March 19, 1951, and now abandoned.

Referring first to Fig. 2, the titration is usually performed in a titration vessel 10 supported on a conventional magnetic stirring device 11 which serves to rotate a magnetic stirring bar 12 within the vessel. The top of the vessel is closed by a stopper 13 which supports a vent tube 14 and a delivery tube 15.

The delivery tube 15 provides an enlarged portion 16 at the base of which is a frusto-spherical ground valve seat 17. The delivery tube 15 has a contracted portion 18 forming a valve stop, serving a purpose to be later described. The upper end of the tube 15 carries a stopper 19 receiving the lower contracted end 20 of a burette tube 21. A manually operated stopcock 22 acts as a shut-off valve for the burette tube. The entire delivery tube 15 may be composed of glass or similar material.

Arranged within the tube 15 between the enlarged portion 16 and the contracted portion 18 is a weighted valve element 23 having a core 24 made of magnetic material such as iron, this core being surrounded by a casing 25 formed of glass or similar material inert to the liquids flowing through the delivery tube 15. The lower end of the valve element 23 carries a frusto-spherical valve element 26 which is somewhat greater than a hemisphere and which is adapted normally to rest on the seat 17 to shut off any flow from the burette tube to the titration vessel 10.

Secured to the delivery tube 15 is an enlarged casing 27 in which is mounted a valve-actuating winding shown as a solenoid coil 28 which encircles the tube 15. When energized, the solenoid coil 28 moves the valve element 23 upwardly against the contracted portion 18 to permit flow from the burette tube 21 to the titration vessel 10. The solenoid coil 28 with the valve element 23 and associated equipment forms an operating means for applying withholding and reapplying a displacement action, here a flow of fluid from the burette, to an environment, here illustrated as a body of material 29 to be titrated. In titration equipment, the operating means is preferably a valve, but other types of sensitive electromagnetically operated valves than the one illustrated can be employed.

The invention provides a sensing means for creating a signal each time the condition of the environment swings in a given or forward direction beyond the desired final value at the start of a transient excursion and for creating another signal each time the reverse displacement again swings the condition in an opposite direction beyond the desired final value at the end of a transient excursion. In the illustrated embodiment, this sensing means includes in part a pair of electrodes 30 and 31 each having a portion submerged in the material 29. These electrodes may be sealed in the walls of the titration vessel 10, as suggested in Fig. 2, or may dip into the material 29 as suggested in Fig. 1. When a suitable electric potential is applied between the electrodes 30 and 31, which are preferably formed of the same material, typically platinum, a signal will be created each time the endpoint of the material 29 is reached. These signals will be caused by a sudden change in polarization adjacent one or both of the electrodes. When employing the dead-stop technique with a forward direction of titration, the cathode will be polarized and the anode unpolarized prior to reaching an endpoint, and electrode current will be relatively very small. Beyond the endpoint, neither electrode is polarized, and the electrode current abruptly rises to a higher value. In the reverse or back titration, the initial current is relatively high but then falls suddenly when an endpoint is reached. These sudden changes in current give rise, in the illustrated embodiment, to the aforesaid signals.

The invention includes an automatic timing means in the form of a timer 35 shown diagrammatically in Figs. 1 and 3. It also includes a means for operatively connecting the timer to the sensing means to start the timer at the beginning of each transient excursion and reset it to its initial state, usually to zero, at the end of each transient excursion, this starting and resetting occurring respectively in response to the aforesaid signals. The timer 35 is schematically shown as including a dial 36 and a pointer 37 moving as a function of elapsed time and driven by a motor 38 operatively connected to the pointer 37 by a connection indicated by the dotted line 39 of Fig. 1. Forward movement of the pointer 37 is initiated upon energizing the motor 38. If the current to the motor is interrupted at any time, a spring, not shown, integral with the timer returns the pointer 37 to zero. The timer is also shown as including a second pointer 40 readable against the time scale on the dial 36 and adjustable in position by a control element 41 operatively connected to the second pointer 40 as suggested by the interconnecting dotted line of Fig. 1. A single-pole, double-throw switch 42 is operatively connected to the timer 35, as suggested by dotted line 43 of Fig. 1, to move from side contact 44 to side contact 45 when the pointer 37, indicating elapsed time, moves for a period of time corresponding to the pre-set value of the second pointer 40. The switch arm of the switch 42 can again be caused to engage the side contact 44 only upon operation of a manual actuator 47 carrying the "Push-to-titrate" button 48 on the front of the instrument panel. The switch arm is displaced from the contact 44 only by the operation of the timer, and this displacement also returns the timer to zero because the contact 44 is in the supply circuit of the motor 38.

Referring particularly to Fig. 1, the circuit is energized from a source of alternating current potential through an input plug 50 connected to a power switch 51. Beyond this switch is connected the stirrer 11 through a suitable switch 52.

Connected to the plug 50 through conductors 53 and 54 is the primary winding of a step-down transformer 55, the secondary winding being connected to a dry-disc rectifier 56, preferably of the full-wave type as shown. The rectifier 56 supplies direct current across conductors 57 and 58 between which are connected tapped resistors 60 and 61 acting as voltage dividers and used respectively to supply a suitable voltage for energizing a power relay 63 and to supply current in a suitable voltage range for the electrodes 30 and 31. Across a tapped portion of the resistor 61 is an adjustable potentiometer 64 of relatively higher resistance, used to adjust the potential applied across the electrodes and thereby determine electrode current levels in the polarized and de-polarized states. This potentiometer represents a "Polarize" control adjustable from the front of the instrument. A sensitive microammeter 65 is connected serially in a conductor joining the electrode 30 and the conductor 58.

The electrode 31 is connected to the potentiometer 64 through a coil 66 of a galvanometer-type relay 68 which is sensitive to current changes of the order of microamperes in the electrode-energizing circuit. This sensitive relay 68 provides side contacts 70 and 71 engageable alternately by a main contact 72. When the current through the relay winding 66 is above a predetermined value, the main contact 72 engages the side contact 70. Conversely, when the current through the winding 66 drops to a certain set value below the predetermined value, the main contact 72 moves to engage the side contact 71. The operative connection between the winding 66 and the main contact 72 is indicated diagrammatically in Fig. 1 by the dotted line 73. It is preferable to shunt the winding 66 with a potentiometer 74, acting as a "Sensitivity" control and adjustable from the panel of the instrument (see Fig. 3). This is used to adjust the sensitive relay to trigger at the desired upper value of electrode current.

The invention preferably includes a two-section, three-position selector switch 75 operable from the front of the instrument panel. The sections are indicated by $S_1$ and $S_2$, the dotted line 78 indicating the ganged connection therebetween. Each switch section is adapted to assume one of the three positions shown. In position 1, $S_1$ short-circuits the electrodes 30 and 31, but in positions 2 and 3 the short-circuit is removed and the electrodes are in the circuit.

The sensitive relay 68 acts as a single-pole, double-throw switch to control the current energizing a winding 80 of the power relay 63, this winding being usually shunted by a resistor 81. A resistor 82 and a capacitor 83 may be connected serially in parallel with the winding 80 to slow the response of the power relay and make it less sensitive to environmental vibrations that might otherwise energize the power relay when accidentally triggering the sensitive relay 68. Operatively, associated with the winding 80 through a connection, indicated by the dotted line 84 of Fig. 1, are normally closed and normally open contacts illustrated as comprising a main contact 85 normally engaging a side contact 87 but moving into engagement with a side contact 86 upon energization of the winding 80.

The contacts of switch $S_2$ corresponding to positions 1 and 3 are respectively connected to the side contacts 70 and 71 of the sensitive relay; also the contacts corresponding to positions 1 and 2 are interconnected. Correspondingly, when $S_2$ is in positions 1 and 2, the relay contacts 70 and 72 will energize the power relay when a predetermined high limit of electrode current, e. g., 40–50 microamperes, is reached. When $S_2$ is in position 3, however, the contacts 71 and 72 of the sensitive relay will trigger the power relay when the electrode current falls to a predetermined minimum value. Switch position 2 is used for the usual forward titration, and switch position 3 for back titrations. Switch position 1 is used to short-circuit the electrodes when adjusting the response level of the instrument prior to titration.

Referring more particularly to the left half of Fig. 1, illustrating the circuit employed for timing each successive transient excursion and providing a means for automatically terminating the titration when the duration of such a transient excursion reaches or exceeds a predetermined value, this portion of the circuit is operated by alternating current. The motor 38 for the timer is connected between the conductors 53 and 54 in series with the normally open contacts 85 and 86 of the power relay and the normally closed side contact 44 of the timer switch 42. Connected in parallel with the motor 38 is a signaling means shown as a "Stand-by" light 90. Connected between the side contact 87 of the power relay and the side contact 44 of the timer switch 42 is the solenoid coil 28 or other valve actuator coil. A switch 91, which may be labeled a "Burette" switch, is preferably included in this circuit. Connected across the coil 28 and the switch 91 is a signalling means shown as a "Titrate" light 92. A "Read burette" light 93 is connected between the conductor 54 and the side contact 45 of the timer switch 42.

In setting up the instrument for titration, certain preliminary adjustments are made. Initially, the power switch 51 and the switch 91 are open, the potentiometers 64 and 74 being set to apply a zero polarizing potential and minimum relay sensitivity. With the selector switch $S_1$, $S_2$ in position 1, the power switch 51 is closed and the timer switch 42 is manually set to engage the side contact 44, this being accomplished by actuation of "Push-to-titrate" button 48. The "Titrate" light 92 is now illuminated. The "Polarize" potentiometer 64 is now turned until a reading of 35–40 microamperes is indicated by the microammeter 65. The "Sensitivity" potentiometer 74 is then turned until the contacts of the power relay shift to illuminate the "Stand-by" light 90 and simultaneously de-energize the "Titrate" light 92. This also starts the timing motor 38. At the end of the time interval set by the control 41, the timer switch 42 shifts to engage the side contact 45, thus de-energizing the motor 38, resetting the timer to zero, de-energizing the "Stand-by" light 90 and illuminating the "Read burette" light 92. With the electrodes now immersed in a typical sample solution wherein they are polarized, as in a "forward" Karl Fisher titration prior to reaching the endpoint, the selector switch is turned to position 2, and the "Polarize" control 64 is adjusted until the microammeter 65 reads between 5 and 10 microamperes. The instrument is now properly adjusted and is ready for actual titration by opening the burette valve 22 and closing the burette-control switch 91. The preliminary adjustments need not again be changed so long as a series of similar titrations is being performed.

To titrate the sample, the selector switch $S_1$, $S_2$ is suitably positioned depending on whether the titration is of the forward or reverse type, and the "Push-to-titrate" button 48 is actuated to move the timer switch to close the side contact 44, resulting in illumination of the "Titrate" light 92, the contacts 85 and 87 of the power relay being closed at this time. The solenoid coil 28 is then in energized condition to lift the valve member 26 from its seat and cause reagent to flow from the burette into the titration vessel. As the endpoint is approached for the first time, the signal from the titration vessel will actuate the sensitive relay to move contact 72 from contact 71 to contact 70, if the titration is of the forward type, or in the reverse direction if the titration is of the reverse type. In either case, contact 72 acts to energize the power relay 63 to engage the contacts 85 and 86 of the latter. This de-energizes the solenoid coil 28 and halts delivery of fluid to the titration vessel. Simultaneously, it energizes the motor 38, de-energizes the "Titrate" light and energizes the "Stand-by" light 90. Although the conditions in the titration vessel have proceeded beyond the endpoint, they tend to return thereto to complete the transient excursion. When the endpoint is again reached, the relays 68 and 63 cause disengagement of the contacts 85 and 86 to de-energize the timer motor 38, whereby it is automatically reset to zero, and to de-energize the "Stand-by" light 90. Contacts 85 and 87 immediately engage to re-energize the solenoid 28 and the "Titrate" light 92. The electromagnetically controlled valve thus again opens to supply additional titrant to the titration vessel.

The action sequence described above is repeated, and the transient excursions become of increasing length as the titration nears completion. As soon as the duration of a transient excursion reaches that for which the timer 35 is pre-set, the timer will actuate the timer switch 42 to engage the side contact 45, thus de-energizing the motor 38, lights 90, 92 and the solenoid coil 28 while illuminating the "Read burette" light 93. This notifies the operator that the titration has been terminated. The burette may now be read to determine the volume dispensed to react with the water in the sample. The water content of the sample will be proportional to the dispensed volume of reagent.

If a series of samples is to be titrated, it is not necessary to empty the titration vessel following determination of each sample. The samples may merely be added in succession to the titrating vessel and successively titrated by the apparatus until the volume of liquid in the vessel becomes inconveniently large. The volumes of reagent successively delivered are then the repective measures of titrated content in the several samples.

It will be apparent that the methods and apparatus heretofore described can with minor changes be adapted to other automatic operations, particularly where the condition of the environment tends to over-shoot a desired final value and return thereto during a transient excursion. The displacement action can be controlled automatically in response to the operation of the timer and, if desired, a signalling means can indicate when the condition of the environment has reached the desired final value.

Various changes and modifications can be made without departing from the spirit of the invention.

I claim:

1. A method for displacing the condition of an environment toward a desired precise final equilibrium value, the environment being characterized by transient excursions past the equilibrium value as displacement actions are applied in an attempt to reach said value, the environment tending to reverse said displacement in a direction toward said value to reach such value and thus complete the transient excursion in a time depending upon the closeness of the condition to the desired final value, said method including the steps of: applying to said environment while in a first state a displacement action tending to displace said environment in a given direction toward said desired final value until said environment is displaced beyond said final value by a transient excursion; then temporarily withholding the displacement action until the reverse displacement swings the environment back through said final value and therebeyond to a second state closer to said final value than said first state; successively repeating the aforesaid steps while automatically maintaining uniformity in the successive displacement actions to produce a plurality of said transient excursions beyond said final value yet returning thereto, said plurality of transient excursions being of successively longer time duration; timing the duration of each of said transient excursions; and finally terminating further displacement actions when such timing of a transient excursion evidences a transient excursion which equals in duration a predetermined time.

2. A method as defined in claim 1 in which the start of any displacement beyond said final value in said given direction to produce said transient excursion is electrically sensed and produces an electric signal, and in which each transient excursion is timed by a timing operation initiated by said electric signal.

3. A method as defined in claim 1 in which each successive transient excursion is timed by a timing device which is reset to zero between the transient excursions.

4. A method as defined in claim 1 applied to the accurate titration of a substance to an endpoint which is said equilibrium value.

5. A method as defined in claim 4 in which the endpoint is determined by a sudden change in polarization of at least one of two electrodes formed of the same material and respectively having portions submerged in a liquid undergoing test.

6. Apparatus for displacing the condition of an environment toward a desired precise final equilibrium value, the environment being characterized by transient excursions past the equilibrium value as displacement actions are applied in an attempt to reach said value, the environment tending to reverse said displacement in a direction toward said value to reach such value and thus complete the transient excursion in a time depending upon the closeness of the condition to the desired final value, said apparatus including; operating means for applying, withholding and reapplying said displacement action to said environment; sensing means for creating a signal each time said condition swings in said given direction beyond said desired final value at the start of a transient excursion and for creating another signal each time said reverse displacement swings said condition in an opposite direction beyond said desired final value at the end of a transient excursion; means for operatively connecting said sensing means and said operating means to withhold said displacement action in response to said first-named signal from said sensing means and to reapply said displacement action in response to said other signal from said sensing means; a timer; means operatively connecting said sensing means and said timer to start and reset to its initial state said timer respectively upon occurrence of said signals whereby said timer successively and individually times said transient excursions of successively longer time duration; and means operatively connecting said timer and said operating means to terminate all applications by the latter of said displacement actions in said given direction when the duration of any transient excursion exceeds a predetermined time.

7. Apparatus as defined in claim 6 including means for adjusting said timer to change said predetermined time.

8. Apparatus as defined in claim 6 including a signalling means operated by said timer and operating upon termination of all applications of said displacement actions by said operating means for signalling such termination.

9. Apparatus as defined in claim 6 including a meter connected to said sensing means for indicating changes in said condition of said environment.

10. Control apparatus for accurately adjusting a chemical environment to a desired final equilibrium value, the chemical environment resulting from the mixing of two media, said apparatus including; operating means for controlling the incremental delivery of one of said media to the other, such delivery applying said displacement action in said given direction and tending if continued to swing said environment beyond said desired final value; sensing means for creating a signal each time said environment thus swings beyond said desired final value because of such delivery and at the beginning of a transient excursion and for creating another signal each time said reverse displacement swings said environment in an opposite direction beyond said desired final value at the end of a transient excursion; means for operatively connecting said sensing means and said operating means to withhold said delivery in response to said first-named signal from said sensing means and to restart said delivery in response to said other signal; a timer startable from an initial state and resettable to such initial state; means operatively connecting said sensing means and said timer to start and reset said timer respectively upon occurrence of said signals whereby said timer successively and individually times said transient excursions of successively longer time duration; and means to terminate all delivery of said one of said media to the other when the duration of any transient excursion exceeds a predetermined time.

11. Control apparatus as defined in claim 10 in which said operating means is an electrically-actuated valve responsive to said signals from said sensing means to withhold and restart said delivery of said one of said media to the other.

12. Control apparatus as defined in claim 10 in which said means for operatively connecting said sending means and said operating means includes a power relay.

13. Control apparatus as defined in claim 12 in which said power relay has normally closed contacts and normally open contacts alternately closing two circuits, and in which said timer is operatively connected to one of said circuits.

14. Control apparatus as defined in claim 13 in which the other of said circuits is operatively connected to said operating means to actuate same alternately with said timer.

15. Control apparatus as defined in claim 12 including a sensitive relay controlled by said sensing means and including contact means connected to said power relay to actuate same.

16. Control apparatus as defined in claim 15 in which said sensing means produces an electrical output, and in which said contact means of said sensitive relay include a movable contact means, a first side contact engaged by said movable contact means to complete the circuit to said power relay when the electrical output of said sensing means is above a predetermined output value, and a second side contact engaged by said movable contact means to complete the circuit to said power relay when the electrical output of said sensing means is at a value below said predetermined output value, said control apparatus including a selector switch controlling which of said side contacts is connected to control said power relay.

17. Control apparatus as defined in claim 16 in which said selector switch has a position to short-circuit said electrical output of said sensing means.

18. Control apparatus as defined in claim 10 in which said timer includes a timing mechanism and a timer switch operated thereby to change from one position to another upon lapse of said predetermined time after starting of said timer, said timer switch in moving to said other position terminating all delivery of said one of said media to the other until the timer switch is again moved to said one position.

19. Control apparatus as defined in claim 18 in which said timer switch when in said other position completes a circuit to a signalling means indicating termination of all delivery of said one of said media to the other.

20. Control apparatus as defined in claim 18 including a manual actuator for said timer switch for again moving same into said one position.

References Cited in the file of this patent

UNITED STATES PATENTS 2,389,204  Lodi _____ Nov. 20, 1945
2,626,385  Schumann _____ Jan. 20, 1953

OTHER REFERENCES

Berhenke: I. and E. Chem., vol. 38, May 1946, page 544.

Catalog—Schaar and Co., No. 50, May 1950, page 632.